United States Patent [19]

Löliger et al.

[11] Patent Number: 4,890,639
[45] Date of Patent: Jan. 2, 1990

[54] PRESSURE REGULATING VALVE

[75] Inventors: Willi Löliger; Rudolf Schmied, both of Konolfingen, Switzerland

[73] Assignee: Nestec S. A., Vevey, Switzerland

[21] Appl. No.: 195,687

[22] Filed: May 18, 1988

[30] Foreign Application Priority Data

Jun. 6, 1987 [EP] European Pat. Off. ........ 87108238.4

[51] Int. Cl.$^4$ ........................................... F16K 31/365
[52] U.S. Cl. ..................................... 137/510; 137/241
[58] Field of Search ............... 137/510, 859, 906, 241; 251/61; 422/103, 109, 116

[56] References Cited

U.S. PATENT DOCUMENTS

| | | | |
|---|---|---|---|
| 1,346,921 | 7/1920 | Terry | 137/906 X |
| 2,011,812 | 8/1935 | Hatcher et al. | 137/906 X |
| 2,335,250 | 11/1943 | Adlam | 137/114 X |
| 2,622,610 | 12/1952 | Rowe et al. | 137/510 X |
| 3,583,440 | 6/1981 | Andersson | 137/510 X |
| 4,238,447 | 12/1980 | Wolff | 422/109 X |
| 4,239,730 | 12/1980 | Fahlvik et al. | 422/111 X |

FOREIGN PATENT DOCUMENTS 723267 3/1980 U.S.S.R. ............... 137/510

Primary Examiner—Stephen M. Hepperle
Attorney, Agent, or Firm—Vogt & O'Donnell

[57] ABSTRACT

A device is provided for regulating the pressure of a liquid flow. The device includes two housing portions having open ends in mating engagement between which a flexible membrane, which hermetically seals the open ends, is maintained. Thus, one of the housing portions defines a first chamber into and through which the liquid to be regulated flows and the other defines a second chamber into which regulating fluid is provided. A two-portion guided elongated pin, movable in a reciprocal manner along its longitudinal axis, extends from an outlet orifice of the first chamber to a linearly aligned second chamber bore. The two portions of the pin converge at the membrane and are coupled by a male-female coupling and grip the membrane. In operation of the device, the pin, which has a hollowed portion abutting the outlet orifice, is moved by reason of pressure effected on active surfaces of the membrane and opens and closes the outlet orifice. The device is embodied such that the active surface of the membrane affected by a pressure of a regulating fluid is larger than the active surface of the membrane affected by the pressure of the liquid to be flow-regulated.

11 Claims, 2 Drawing Sheets

PRESSURE REGULATING VALVE

BACKGROUND OF THE INVENTION

This invention relates to a fluid-controlled back-pressure and expansion valve for automatically regulating the pressure of a liquid, especially in a heat-treatment installation, more especially an ultra-high-temperature pasteurizer or sterilizer.

In ultra-high-temperatures pasteurizers or sterilizers, the temperature of the liquid to be treated is rapidly increased, the increased temperature is maintained for a short time in a dwell tube and is then rapidly reduced by expansion in a reduced-pressure chamber. Means for retaining the liquid have to be provided at the outlet of the installation to keep the pressure in the dwell tube at a constant value above the boiling pressure of the liquid and hence to avoid the formation of a two-phase (liquid and vapour) stream which would make it impossible to regulate the dwell time. Since this back-pressure is related to heat-treatment temperature, it has to be above the saturated vapour pressure of the liquid at that temperature. Advantageously, the retaining means may also serve as expansion means for the liquid in the reduced-pressure chamber.

A simple expansion nozzle is normally used for this dual function. With an expansion nozzle, the back-pressure is proportional to the square of the throughflow. In other words, an expansion nozzle is particularly sensitive to variations in throughflow and also to the temperature, to the temperature gradient resulting from expansion and to the viscosity of the liquid to be treated. The soiling of the nozzle itself after long production cycles accentuates these adverse effects. During the cleaning cycles, it is desirable that the throughput of cleaning preparation be higher than the normal production throughput. In fact, in accordance with its design features, an expansion nozzle of the type in question is only suitable for a very narrow throughput and temperature range and for the particular type of liquid to be treated. Efforts have been made to improve the performance of the nozzles by lengthening them and increasing the nozzle diameter so that expansion actually begins within the nozzle itself. With a nozzle of this type, the back pressure increases linearly with the throughput so that the nozzle may be used over a wider range of throughputs. However, neither one nor the other is suitable in the starting phase of continuous sterilizers comprising long dwell times of the order of 2 to 15 minutes. During the temperature increase period of the dwell tube, which is filled with water without expansion occurring, the nozzles allow a very high throughflow of liquid, the counter-pressure for which they provide being inadequate. A two-phase stream is thus formed, the expansion chamber becomes filled with cold water and the temperature-control and level-control systems no longer function correctly.

Another type of back-pressure means consists of a membrane pressure controller which controls a valve through a valve pin resting on the controlled side of the membrane and a screw which regulates the tenion of a spring resting on the controlling side of the membrane. The spring may optionally be replaced by a fluid under pressure on the controlling side, as in the case for example in U.S. Pat. No. 2,335,250. The spring-loaded valves require frequent adjustment. The valve pins tend to become blocked in high-temperature operation. The passage between the valve and its seat is narrow and is easily fouled. In the equilibrium state, the pressures above and below the membrane are identical. The valve responds to variations in pressure through an elastic membrane of relatively large surface area which is thus fragile. In addition, there is no removal opening for the liquid ensuring expansion.

A last type of known valve for adjustment of the pressure of a liquid is provided with a large-surface diaphragm carrying a double membrane mounted in an annular ring and reinforced by metallic sectors. The diaphragm is traversed by a rod hollowed out at its end to form outlet orifices for the liquid. The pressure on the membrane on the controlling side is provided by compressed air. In the operational state, the pressures are equal on both sides of the membrane. A valve of the type in question is suitable for temperatures of up to about 120° C. Beyond this limit, it becomes unstable and tends to "pump". The diaphragm is deformed and the valve soon becomes unuseable. In addition, it is not designed to be connected to a vacuum. Finally, the types of membrane valve described above do not comply with the hygiene-related safety requirements for aseptic operation. Their construction, particularly in the vicinity of the zones where the membrane is fixed, makes it difficult for the cleaning preparations to reach certain parts.

SUMMARY OF THE INVENTION

The object of the present invention is to obviate the disadvantages of known arrangements and to provide a simple membrane valve of compact construction for the retention and expansion of liquids, particularly liquids which are to be heat-treated, which remains stable under conditions of prolonged use, for example in an ultra-high-temperature sterilizer, over a wider range of throughputs, which does not run any risk of contamination by the controlling fluid, even in the event of a leak in the membrane, and which may readily be cleaned and sterilized in place.

The valve according to the invention comprises a first chamber traversed by the liquid having an inlet orifice and an outlet orifice for connection to a dwell tube and to an expansion chamber, respectively, a second chamber hermetically separated from the first by a flexible membrane, said second chamber receiving a control fluid, and a guided pin hollowed out at its end near the outlet orifice, integral with the membrane and sliding in the outlet orifice between two end positions so as to block the orifice in its first position and to allow the liquid to pass through in its opposite position.

The valve according to the invention is characterized in that the active surface of the membrane on the liquid side is smaller than the active surface of the membrane on the control fluid side to keep the pressure of the liquid at a value above that of the control fluid irrespective of the throughflow of the liquid.

In more detailed summary, the flow regulating device of the present invention is characterized by two housing portions, one of which defines a first chamber having an open end the other housing portion defining a second chamber having an open end abutting the open end of the first chamber, the walls of the first and second chambers being configured at their open ends for mating engagement. The first housing portion also includes a liquid inlet orifice and a liquid outlet orifice positioned through the housing walls for receiving and distributing liquid flow to be regulated, the outlet orifice being positioned opposite the open end of the first portion. The second housing portion also includes an orifice for providing regulating fluid and a bore in linear alignment with the first housing portion outlet orifice.

A flexible membrane is positioned and maintained between the open ends of the two housing chamber portions for hermetically sealing the open ends of the first and second housing portions. A two-portion guided elongated pin is positioned in the chamber, the two parts of the pin extending, respectively, from the first housing portion outlet orifice to the membrane and from the second housing portion bore to the membrane, the two parts being coupled by a male-female coupling at their convergence at the membrane which, together with the membrane, are configured for gripping the membrane. The pin is movable in a reciprocal manner with respect to its longitudinal axis.

In operation of the device, the pin, which has a hollowed portion abutting the outlet orifice, is moved by reason of pressure effected on the membrane for blocking the first housing portion outlet orifice and for opening the outlet orifice for regulating liquid flow to be regulated while blocking the second chamber linearly aligned orifice from flow of regulated fluid. The device is embodied such that the active surface of the membrane affected by the regulating pressure is larger than the active surface of the membrane affected by the pressure of the fluid or liquid to be flow regulated.

One example of embodiment of the valve according to the invention is described in detail with reference to the accompanying drawings.

DETAILED DESCRIPTION OF THE EMBODIMENT OF THE DRAWINGS

Figure 1:
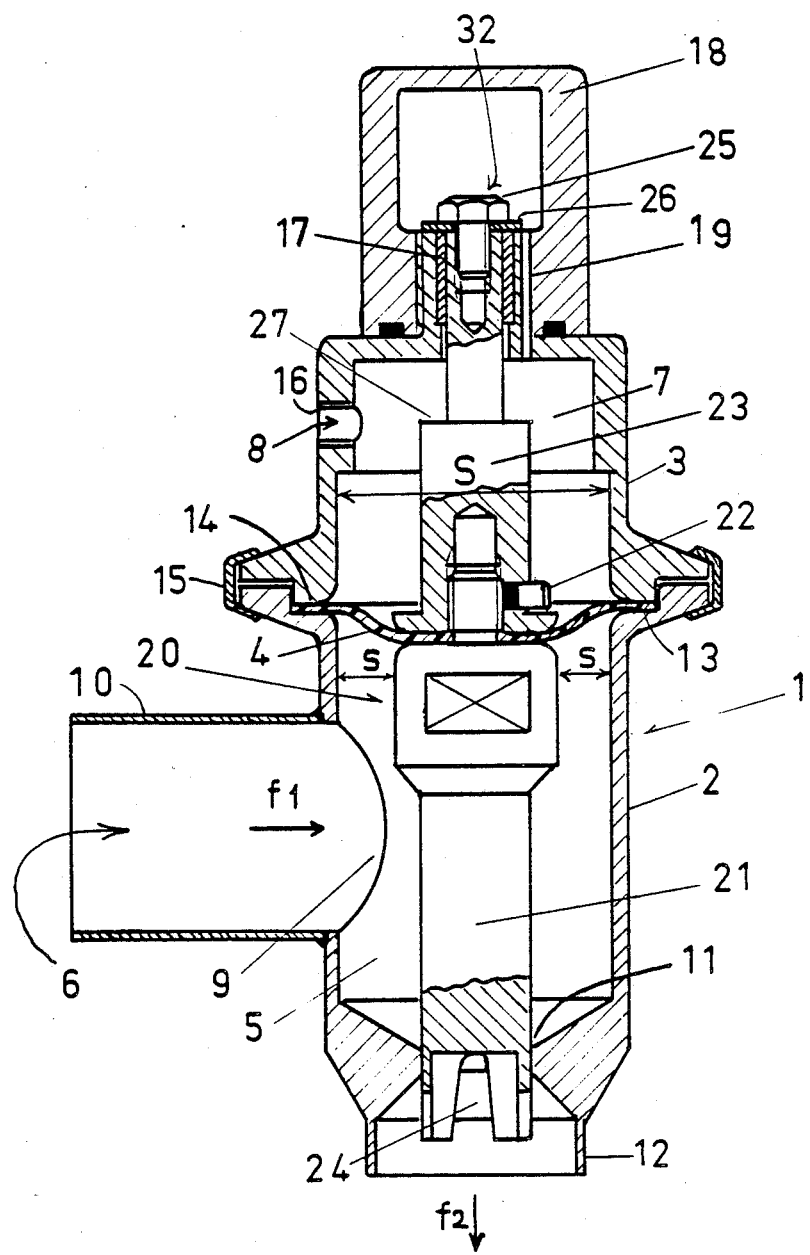
FIG. 1 is a longitudinal section through the valve.
Figure 2:
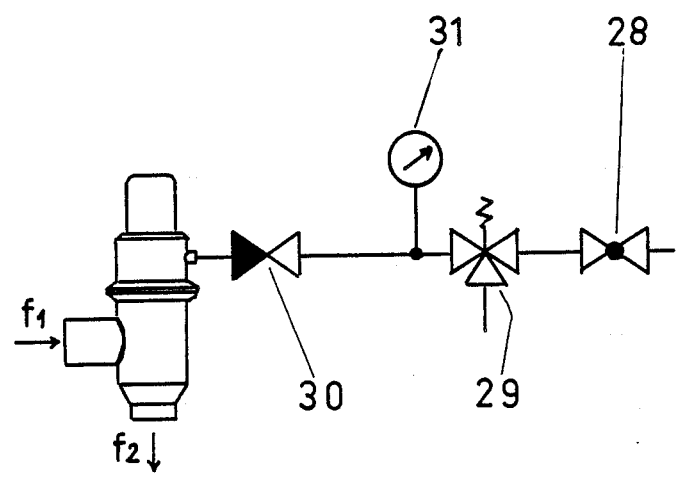
FIG. 2 is a diagrammatic view of the regulating means associated with the control fluid.
Figure 1:
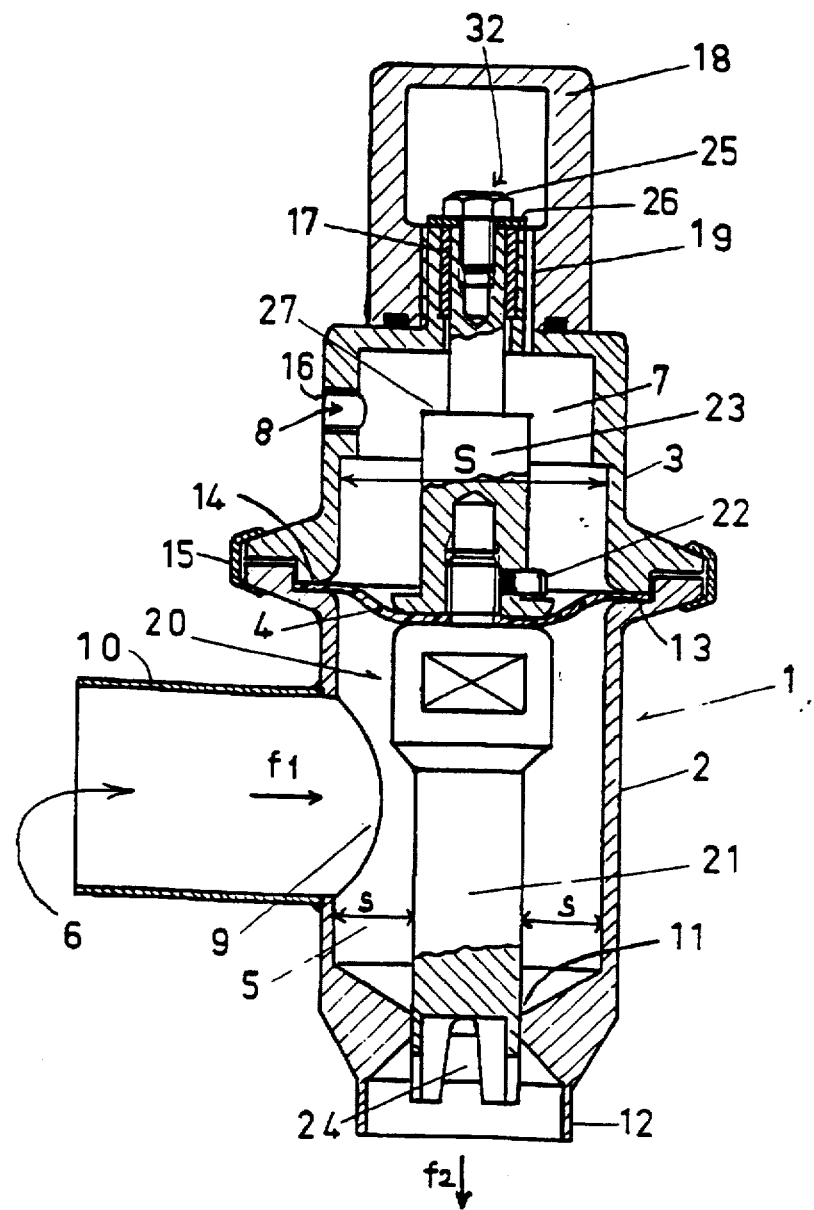

The valve comprises a cylindrical body 1 in two parts (2,3) separated by a membrane 4 which respectively delimits a chamber 5 for the passage of the regulated liquid 6 and a chamber 7 occupied by the regulating fluid 8, for example air. The liquid enters the chamber 5 from the dwell tube 10 through the lateral orifice 9 in the direction of arrow f1. At its lower end, the body 2 is traversed by a passage 11 which narrows and then widens in the form of an annulus of trapezoidal cross-section.

The passage 11 serves simultaneously as a valve seat, as an exit for the liquid (in the direction of arrow f2) and as a guide ring for the valve pin, as will be explained hereinafter. The passage is extended by a skirt 12 opening into a reduced-pressure chamber (not shown), which may be, for example, the expansion vessel of the sterilizer or the body of a falling-film evaporator. The body 2 is provided at its upper end with a groove 13 into which fits a shoulder 14 on the lower part of the body 3. The membrane 4 is gripped at its periphery between the groove 13 and the shoulder 14. The two parts of the valve body are held together by a collar 15. A lateral orifice 16 is formed in the body 3 for the entry of the regulating fluid. On its upper part, the body 3 comprises a bearing 17 for guiding the valve pin, to which a cap 18 is fixed, for example by screwing. The chamber 7 communicates with the interior of the cap through a channel 19.

The membrane 4 is holded at its centre where it is traversed by the valve pin 20. The pin 20 comprises a male part 21 to which a female part 23 is fixed, for example by screwing and then locking by the screw 22. The membrane 4 is gripped between the two parts of the pin. The male part 21 is hollowed out at its lower end and comprises orifices 24 of elongate form for the exit of the regulated liquid. It is desiged to slide in the guide ring 11.

The male part 21 of the pin and the body 2 preferably have no sharp angles so that all the components present in the chambers 5 are accessible to cleaning and sterilizing preparations. The female part 23 of the pin slides in the bearing 17. The movement of the pin 20 and, hence, the end positions of the liquid outlet orifices are regulated on the one hand by means of the bolt 25 carrying a washer 26 screwed to the female part 23 and, on the other hand, by a shoulder 27 of the female part 23, the washer 26 and the shoulder 27 bearing against the body 3. The membrane 4 is preferably made of a flexible material of high mechanical and thermal stability, for example polytetrafluoroethylene. The body 2 and the male part of the pin 21 which are in contact with the liquid are preferably made of chromium-plated stainless steel.

The valve operates as follows:
Compressed air from a source at approximately 6 bar is admitted into the chamber 7 through a check valve 28 via a pressure regulating valve 29. The valve 29 regulates the air pressure between 0.5 and 6 bar. A valve 30 between the chamber 7 and the valve 29 prevents the fluids from returning from the chamber 7. A manometer 31 indicates the pressure in the chamber 7. The air compressed to the chosen pressure, for example 3.7 bar, acts on the upper face of the membrane 4 which causes the pin to descend and closes the valve. The pressure of the liquid admitted into the chamber 5 then increases until it reaches and maintains a value balancing the air pressure, for example 4.2 bar, which is higher by about 0.5 bar than the saturated vapour pressure at the sterilization temperature of approximately 140° C.

When the pressure in the swell tube rises, it acts on the lower face of the membrane 4 which causes the pin to ascend, opens the valve and releases a certain quantity of liquid towards to the expansion chamber. At the same time, the pressure in the dwell tube falls to the selected equilibrium value.

An essential feature of the valve according to the invention is that, over a wide range of throughputs of treated liquid, for example from 2000 to 15000 l/h, the pressure of the liquid is always higher by about 0.5–0.6 bar than that of the compressed air. This is due to the fact that, in the equilibrium state, the product of the pressure by the active surface of the membrane is constant on both sides of the membrane. By "active surface" is meant the total surface on which the fluid acts. Thus, on the regulating side, the active surface is the lower internal section of the body 3, or S, because the air also acts on the upper face 32 of the pin 20 by virtue of the communicating passage between the interior of the cap and the chamber 7. By contrast, on the regulated side, the active surface is the section s of the annular space between the body 2 and the pin 20. This pressure difference in favour of the liquid to be treated is of considerable advantage for working under sterile conditions in that it enables any risk of contamination of the product and the sterilizer by the non-sterile air to be avoided, even in the event of a leak in the membrane. In such a case, the valve 30 would additionally prevent any penetration of the liquid or of sterilizing agents into the compressed air circuit. In addition, the pressure differences does not apply any mechanical stress to the membrane.

The valve may be cleaned in place with high throughputs, for example 2 to 3 times higher than the normal production throughput, for example by rinsing with water, with a solution of alkali, then an acid solution, and then sterilized, for example with superheated water. The air pressure will thus be advantageously reduced.

Another very important advantage of the valve according to the invention is that the pressure levels on the membrane on the regulating side and on the regulated side can be adjusted in the operational state.

It may be mounted with the body either vertical or horizontal with no disadvantage.

The valve according to the invention may be used in the treatment of liquid products which have to be pasteurized or sterilized, for example emulsions or dispersions, in or outside the food industry. It is particularly advantageous in an ultra-high-temperature sterilizer for dairy products.

It may of course be used as simple back-pressure valve in the absence of any heat-treatment of pasteurization or sterilization.

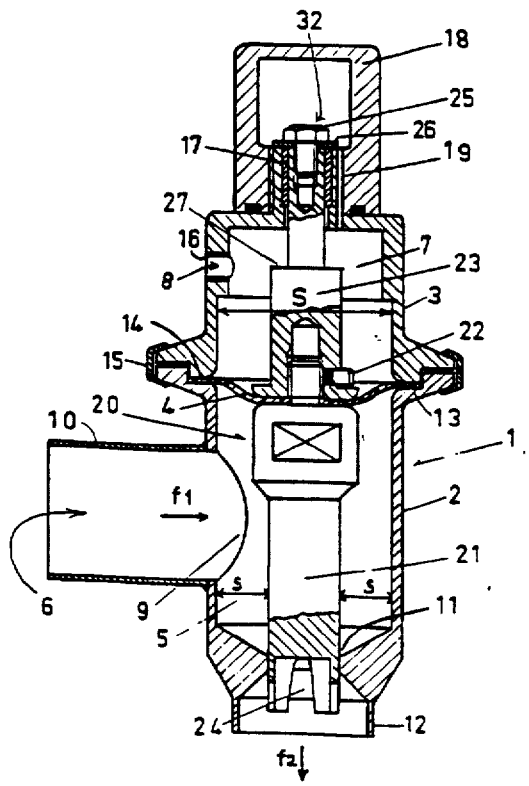

We claim:

1. A fluid-controlled back-pressure and expansion fluid flow control device comprising:
    a first housing portion having walls defining a first chamber, the first housing portion having one open end, an inlet orifice and an outlet orifice for receiving and distributing liquid flow to be regulated, the outlet orifice being positioned opposite the open end;
    a second housing portion having walls defining a second chamber, the second housing portion having one open end abutting the open end of the first chamber, the walls of the first and second housing portions being configured at their open ends for mating engagement, an orifice for providing regulating fluid to the second chamber and a bore in linear alignment with the outlet orifice of the first housing portion;
    a flexible membrane positioned and maintained between the walls and open ends of the two housing portions for hermetically sealing the mated open end of the first chamber from the open end of the second chamber;
    a two-portion guided elongated pin, one portion extending from the first housing portion outlet orifice and the other extending from the second housing portion bore, each portion of the pin extending to a convergence with the other portion at the membrane and being coupled by a male-female coupling with the membrane for gripping the membrane, the pin having a hollowed portion abutting the outlet orifice and being movable in a reciprocal manner along its longitudinal axis for blocking and opening the first chamber outlet orifice for regulating liquid flow to be regulated while blocking the second housing portion bore from regulating fluid flow; and
    wherein an active surface of the membrane affected by pressure of regulating fluid in the second chamber is larger than an active surface of the membrane affected by pressure of liquid to be regulated in the first chamber.

2. A device according to claim 1 further comprising a hollowed cap positioed above and encompassing the second chamber bore and guided pin and further comprising a hollowed channel extending from the hollow of the cap through the housing to the chamber for providing for the second chamber active surface of the membrane affected by pressure being larger than the first chamber membrane active surface.

3. A device according to claim 1 wherein the pin grips the membrane about a hole through which the pin extends.

4. A device according to claim 1 or 2 wherein the first chamber housing portion has a configuration about the liquid flow outlet orifice and the hollowed pin portion in the form of an annulus of trapezoidal cross-section.

5. A device according to claim 1 or 2 wherein the pin has orifices of elongated form about the hollowed pin portion.

6. A device according to claim 4 wherein the pin has orifices of elongated form about the hollowed pin portion.

7. A device according to claim 1 or 2 further comprising a line for providing regulating fluid to the second chamber orifice and a valve for, when activated, preventing flow of fluid and liquid in the line.

8. A device according to claim 1 wherein the first and econd chambers are cylindrical in shape.

9. In ultra-high-temperature sterilizing and pasteurizing apparati having fluid flow regulating devices, the improvement comprising a fluid controlled back-pressure and expansion fluid flow control device comprising:
    a first housing portion having walls defining a first chamber, the first housing portion having one open end, an inlet orifice and an outlet orifice for receiving and distributing liquid flow to be regulated, the outlet orifice being positioned opposite the open end;
    a second housing portion having walls defining a second chamber, the second housing portion having one open end abutting the open end of the first chamber, the walls of the first and second housing portions being configured at their open ends for mating engagement, an orifice for providing regulating fluid to the second chamber and a bore in linear alignment with the outlet orifice of the first housing portion;
    a flexibile membrane positioned and maintained between the walls and open ends of the two housing portions for separating and hermetically sealing and mated open end of the first chamber from the open end of the second chamber;
    a two-portion guided elongated pin, one portion extending from the first housing portion outlet orifice and the other extending from the second housing portion bore, each portion of the pin extending to a convergence with the other portion at the membrane and being coupled by a male-female coupling with the membrane for gripping the membrane, the pin having a hollowed portion abutting the outlet orifice and being movable in a reciprocal manner along its longitudinal axis for blocking and opening the first chamber outlet orifice for regulating liquid flow to be regulated while blocking the second housing portion bore from regulating fluid flow; and wherein an active surface of the membrane affected by pressure of regulating fluid in the second chamber is larger than an active surface of the membrane affected by pressure of liquid to be regulated in the first chamber.

10. A device according to claim 9 further comprising a hollowed cap positioned above and encompasing the second chamber bore and guided pin and further comprising a hollowed channel extending from the hollow of the cap through the housing to the chamber for providing for the second chamber active surface of the membrane affected by pressure for being larger than the first chamber membrane active surface.

11. A device according to claim 9 or 10 wherein the first chamber inlet is connected to a dwell tube and wherein the first chamber outlet is connected to a reduced pressure chamber.

* * * * *

UNITED STATES PATENT AND TRADEMARK OFFICE
CERTIFICATE OF CORRECTION

PATENT NO. : 4,890,639

DATED : January 2, 1990

INVENTOR(S) : Willi Löliger, et al

It is certified that error appears in the above-identified patent and that said Letters Patent is hereby corrected as shown below:

The title page should be deleted, to appear as per the attached title page.

Sheet 1 of 2 should be deleted, to appear as per the attached page.

Signed and Sealed this

Second Day of March, 1993

Attest:

STEPHEN G. KUNIN

*Attesting Officer*    Acting Commissioner of Patents and Trademarks

United States Patent [19]
Löliger et al.

[11] Patent Number: 4,890,639
[45] Date of Patent: Jan. 2, 1990

[54] PRESSURE REGULATING VALVE

[75] Inventors: Willi Löliger; Rudolf Schmied, both of Konolfingen, Switzerland

[73] Assignee: Nestec S. A., Vevey, Switzerland

[21] Appl. No.: 195,687

[22] Filed: May 18, 1988

[30] Foreign Application Priority Data

Jun. 6, 1987 [EP] European Pat. Off. ......... 87108238.4

[51] Int. Cl.⁴ .......................................... F16K 31/365
[52] U.S. Cl. .................................. 137/510; 137/241
[58] Field of Search ............... 137/510, 859, 906, 241; 251/61; 422/103, 109, 116

[56] References Cited

U.S. PATENT DOCUMENTS

| | | | |
|---|---|---|---|
| 1,346,921 | 7/1920 | Terry | 137/906 X |
| 2,011,812 | 8/1935 | Hatcher et al. | 137/906 X |
| 2,335,250 | 11/1943 | Adlam | 137/114 X |
| 2,622,610 | 12/1952 | Rowe et al. | 137/510 X |
| 3,583,440 | 6/1981 | Andersson | 137/510 X |
| 4,238,447 | 12/1980 | Wolff | 422/109 X |
| 4,239,730 | 12/1980 | Fahlvik et al. | 422/111 X |

FOREIGN PATENT DOCUMENTS

723267  3/1980  U.S.S.R. .................. 137/510

*Primary Examiner*—Stephen M. Hepperle
*Attorney, Agent, or Firm*—Vogt & O'Donnell

[57] ABSTRACT

A device is provided for regulating the pressure of a liquid flow. The device includes two housing portions having open ends in mating engagement between which a flexible membrane, which hermetically seals the open ends, is maintained. Thus, one of the housing portions defines a first chamber into and through which the liquid to be regulated flows and the other defines a second chamber into which regulating fluid is provided. A two-portion guided elongated pin, movable in a reciprocal manner along its longitudinal axis, extends from an outlet orifice of the first chamber to a linearly aligned second chamber bore. The two portions of the pin converge at the membrane and are coupled by a male-female coupling and grip the membrane. In operation of the device, the pin, which has a hollowed portion abutting the outlet orifice, is moved by reason of pressure effected on active surfaces of the membrane and opens and closes the outlet orifice. The device is embodied such that the active surface of the membrane affected by a pressure of a regulating fluid is larger than the active surface of the membrane affected by the pressure of the liquid to be flow-regulated.

11 Claims, 2 Drawing Sheets